(12) United States Patent
Choudhary et al.

(10) Patent No.: US 7,505,515 B1
(45) Date of Patent: Mar. 17, 2009

(54) ACCURATE TIMING ALIGNMENTS FOR DECISION DIRECTED CONTINUOUS TIME EQUALIZERS

(75) Inventors: Prashant Choudhary, San Jose, CA (US); Qian Yu, Santa Clara, CA (US); Edem Ibragimov, Santa Clara, CA (US); Venu Balasubramonian, Campbell, CA (US); Debanjan Mukherjee, San Jose, CA (US); Jishnu Bhattacharjee, San Jose, CA (US); Fabian Giroud, San Jose, CA (US)

(73) Assignee: Scintera Networks, Inc., San Jose, CA (US)

( * ) Notice: Subject to any disclaimer, the term of this patent is extended or adjusted under 35 U.S.C. 154(b) by 493 days.

(21) Appl. No.: 11/117,839

(22) Filed: Apr. 29, 2005

(51) Int. Cl.
 *H03K 5/159* (2006.01)
(52) U.S. Cl. ............... 375/233; 375/229; 375/230; 375/231; 375/234; 375/263; 348/607; 348/614; 348/466
(58) Field of Classification Search ........... 375/233, 375/234, 229, 230, 231
See application file for complete search history.

(56) References Cited

U.S. PATENT DOCUMENTS

| | | | | |
|---|---|---|---|---|
| 6,922,440 B2* | 7/2005 | Yu et al. | ............ | 375/233 |
| 7,242,712 B1* | 7/2007 | Katic | ............ | 375/233 |
| 2003/0212947 A1* | 11/2003 | Schenk et al. | ............ | 714/786 |
| 2004/0114700 A1* | 6/2004 | Yu et al. | ............ | 375/371 |
| 2006/0083296 A1* | 4/2006 | Bhattacharjee et al. | ...... | 375/232 |
| 2007/0091995 A1* | 4/2007 | Ibragimov et al. | ......... | 375/233 |
| 2008/0107168 A1* | 5/2008 | Xia et al. | ............ | 375/233 |

* cited by examiner

*Primary Examiner*—Shuwang Liu
*Assistant Examiner*—Kenneth Lam
(74) *Attorney, Agent, or Firm*—Jonathan W. Hallman; MacPherson Kwok Chen & Heid LLP

(57) ABSTRACT

A continuous time equalizer for equalizing an input signal using a feedforward equalizer portion and a feedback equalizer portion is provided that includes: a slicer operable to make bit decisions on a combined output from the feedforward and feedback equalizer portions; an adaptive delay circuit operable to delay the combined output to form a delayed output; and a controller operable to control the delay provided by the adaptive delay circuit such that a first group delay through the slicer and a second group delay through the adaptive delay circuit in response to a sinusoidal form of the input signal are substantially equal.

13 Claims, 2 Drawing Sheets

ACCURATE TIMING ALIGNMENTS FOR DECISION DIRECTED CONTINUOUS TIME EQUALIZERS

FIELD OF INVENTION

This invention relates generally to continuous time equalizers, and more particularly to a continuous time equalizer having improved timing alignments.

BACKGROUND

Intersymbol interference (ISI) is a hindrance to high-speed digital communication. Effective digital communication depends on a sharp transition between data pulses whereas pulse transitions "smear" into each other in communication channels having ISI, a phenomenon denoted as pulse dispersion. Pulse dispersion occurs because high-frequency components of the data pulses are attenuated by the transmission medium. At higher data rates, the interference can become such that data pulses cannot be accurately distinguished from one another, leading to unacceptably high error rates. Such interference may be classified into two types: a) Precursor ISI in which interference from a given pulse (the cursor) leads and interferes with previously sent pulses; and b) Postcursor ISI in which interference from a given pulse trails and interferes with subsequently sent pulses.

Equalizers combat pulse dispersion by partially canceling the high-frequency cutoff that occurs in the transmission medium. A feedforward equalizer performs this mitigation of ISI using a combination of signal samples and thus addresses precursor ISI. In contrast, a feedback equalizer mitigates ISI based upon a combination of past output decisions and thus addresses postcursor ISI. A decision feedback equalizer (DFE) is a combination of both a feedforward and a feedback equalizer and typically provides greater ISI mitigation then either technique alone in that both precursor and postcursor ISI are mitigated. FIG. 1 illustrates an exemplary DFE 10, which includes a feedforward equalizer portion 105 and a feedback equalizer portion 110 to equalize an input signal s(t). A slicer 115 operates on the combined outputs from equalizer portions 105 and 110 to output a current digital decision 120. The number of taps in equalizer portions 105 and 110 is arbitrary and may be denoted as n and m, respectively.

It will be appreciated that a feedback loop (not illustrated) is required to control the adaptation of the coefficients employed in the taps. For example, the input signal to slicer 115 may be sampled and compared to delayed versions of the slicer output signal to generate an error signal. Corresponding error mixers (not illustrated) then process the error signal to generate the coefficients for the feedforward and feedback equalizer portions.

Although DFE equalizers may effectively equalize transmission channels to abate ISI, there are limits to their effectiveness as data rates in the transmission channel continue to be increased. Timing misalignments between the error mixers and the feedforward and feedback portions make ISI performance problematic at higher data rates. For example, semiconductor process variations may cause one portion to operate too slow or fast with respect to the remaining portions.

Accordingly, there is a need in the art for equalizers having adaptive timing alignments.

SUMMARY

In accordance with one aspect of the invention, a continuous time equalizer for equalizing an input signal using a feedforward equalizer portion and a feedback equalizer portion is provided that includes: a slicer operable to make bit decisions on a combined output from the feedforward and feedback equalizer portions; an adaptive delay circuit operable to delay the combined output to form a delayed output; and a controller operable to control the delay provided by the adaptive delay circuit such that a first group delay through the slicer and a second group delay through the adaptive delay circuit in response to a sinusoidal form of the input signal are substantially equal.

In accordance with another aspect of the invention, a continuous time equalizer for equalizing an input signal using a feedforward equalizer portion having a first set of coefficients and a feedback equalizer portion having a second set of coefficients is provided that includes: a slicer operable to make bit decisions on a combined output from the feedforward and feedback equalizer portions; an adaptive delay circuit operable to delay the input signal to form an delayed input; a feedforward error mixer configured to process an error signal representing the difference between the slicer output and the combined output with the delayed input to form the first set of coefficients in a closed mode of operation, the feedforward error mixer forming open loop coefficients in an open loop mode of operation; and a controller operable to perform the following acts: configure the feedforward error mixer into the open loop mode of operation; set a subset of two center coefficients in the first set to one and the remaining coefficients in the first set to zero; set the coefficients in the second set to zero; and control the delay provided by the adaptive delay circuit such that a maximum occurs between a subset of two center coefficients in open loop coefficients in response to a pseudo random bit sequence (PRBS) form of the input signal.

In accordance with another aspect of the invention, a continuous time equalizer for equalizing an input signal using a feedforward equalizer portion having a first set of coefficients and a feedback equalizer portion having a second set of coefficients is provided that includes: a slicer operable to make bit decisions on a combined output from the feedforward and feedback equalizer portions, the slicer forming an output signal having a slicer delay; an adaptive delay circuit operable to delay an output signal from the slicer to form an delayed input signal to the feedback equalizer portion; a feedforward error mixer configured to process an error signal representing the difference between the slicer output and the combined output with the input signal to form the first set of coefficients in a closed mode of operation, the feedforward error mixer forming open loop coefficients in an open loop mode of operation; and a controller operable to perform the following acts: configure the feedforward error mixer into the open loop mode of operation; set a subset of two center coefficients in the first set to one and the remaining coefficients in the first set to zero; set the coefficients in the second set to zero and determine a first phase of the error signal; set a first coefficient $F_0$ in the second set to one and the remaining coefficients in the second set to zero and determine a second phase of the error signal; and control the delay provided by the adaptive delay circuit such that the first phase equals the second phase in response to the input signal having a sinusoidal frequency.

In accordance with another aspect of the invention, a continuous time equalizer for equalizing an input signal using a feedforward equalizer portion having a first set of coefficients and a feedback equalizer portion having a second set of coefficients is provided that includes: a slicer operable to make bit decisions on a combined output from the feedforward and feedback equalizer portions, the slicer forming an output signal having a slicer delay; an adaptive delay circuit operable to delay an output signal from the slicer to form an delayed input signal; a feedforward error mixer configured to process an error signal representing the difference between the slicer output and the combined output with the input signal to form the first set of coefficients in a closed mode of operation, the feedforward error mixer forming first open loop coefficients in an open loop mode of operation; a feedback error mixer configured to process the error signal and delayed input signal to form the second set of coefficients in the closed mode of operation, the feedback error mixer forming second open loop coefficients in the open loop mode of operation; and a controller operable to perform the following acts: configure the feedforward and feedback error mixers into the open loop mode of operation; set a subset of two center coefficients in the first set to one and the remaining coefficients in the first and second set to zero; and control the delay provided by the adaptive delay circuit until a first coefficient F0' in the second open loop coefficients equals zero in response to the input signal having a sinusoidal frequency.

DETAILED DESCRIPTION

Figure 2:
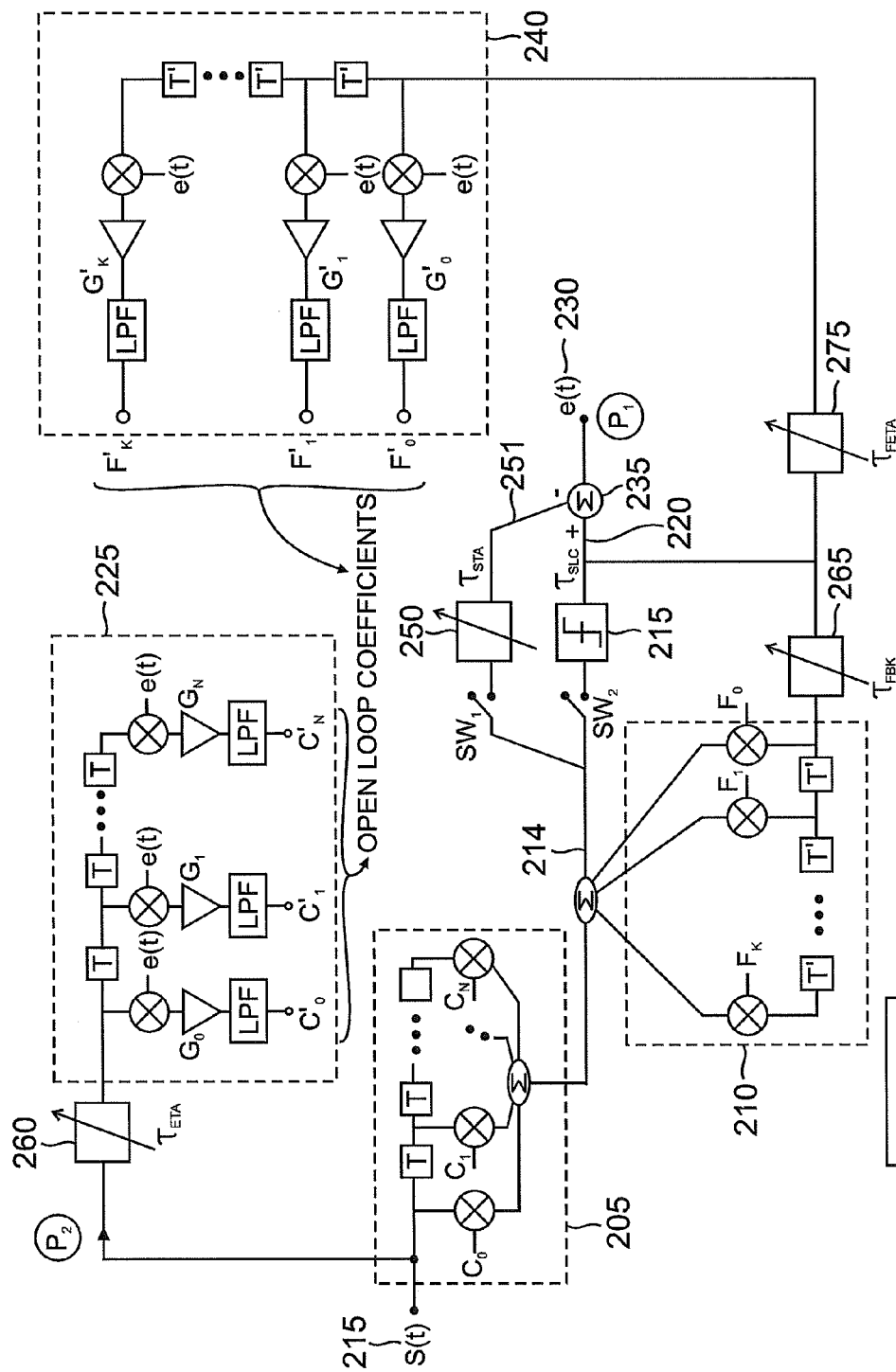
FIG. 2 is a block diagram of an LMS-based decision feedback equalizer in accordance with an embodiment of the invention.

The present invention may be used to time align any continuous-time equalizer having both a feedback and feedforward portion. Although the following discussion will assume that the adaptation of the coefficients in the continuous-time equalizer is least-mean-squares-based (LMS-based), it will be understood that the timing alignment techniques described herein are applicable to other suitable coefficient adaptation techniques as well. Turning now to FIG. 2, an exemplary continuous-time DFE equalizer 200 is illustrated.

Figure 1:
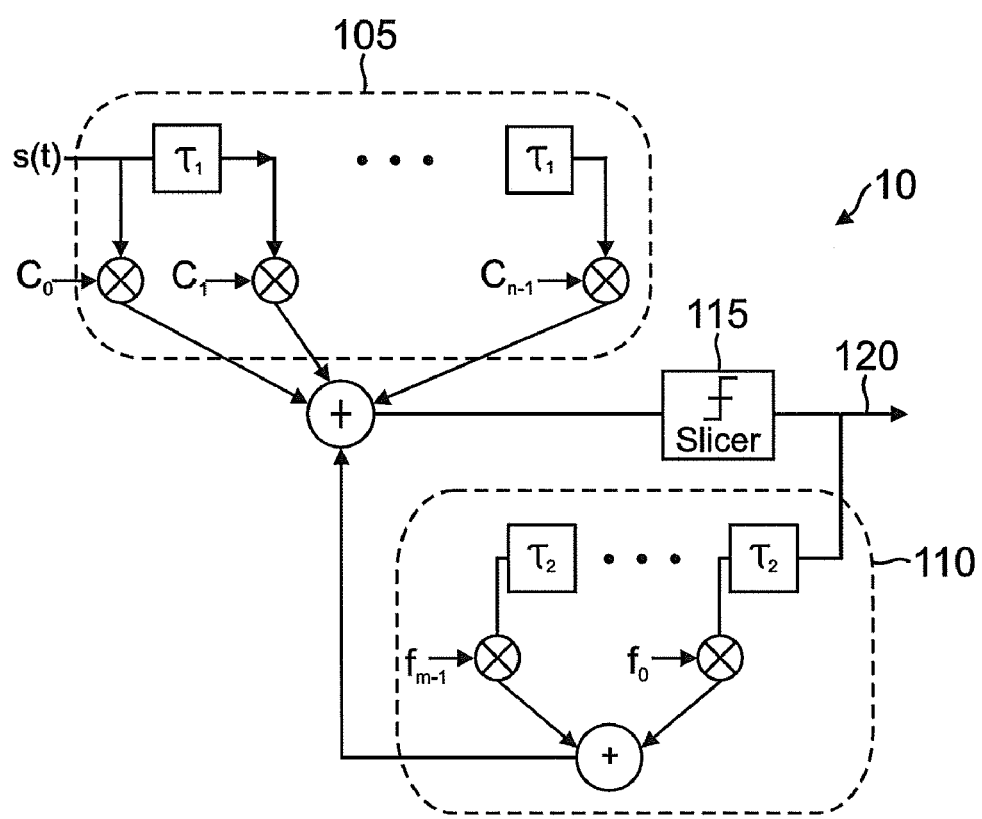
FIG. 1 is a block diagram of a conventional decision feedback equalizer.

As discussed with respect to conventional DFE 10 of FIG. 1, DFE equalizer 200 includes a feedforward equalizer portion 205 and a feedback equalizer portion 210 to equalize an input signal s(t) 211. A slicer 215 operates on a combined output 214 from equalizer portions 205 and 210 to output a current digital decision 220. The number of taps in equalizer portions 205 and 210 is arbitrary and is denoted as (N+1) and (K+1), respectively. Thus, feedforward equalizer portion 205 uses feedforward coefficients $C_0$ through $C_N$ (which may be collectively represented by a vector C) whereas feedback equalizer portion 210 uses feedback coefficients $F_0$ through $F_K$ (which may be collectively represented by a vector F).

Coefficients $C_0$ through $C_N$ are generated by an error mixer 225 responsive to an error signal e(t) 230 formed as the difference between output signal 220 and slicer input signal 214 in adder 235. For example, input signal s(t) 211 is received at a first tap in error mixer 225, mixed with error signal 230, amplified by amplifier $G_0$, and then low pass filtered to form coefficient $C_0$. Similarly, s(t) 211 is delayed by a time "T" corresponding to the delay unit used in feedforward equalizer portion 205, mixed with error signal 230, amplified by amplifier $G_1$, and then low pass filtered to form coefficient $C_1$. The remaining coefficients $C_2$ through $C_N$ are produced analogously as known by those of ordinary skill in the art.

Coefficients $F_0$ through $F_K$ are generated by an error mixer 240 responsive to error signal 230 as well. For example, slicer output signal 220 is mixed with error signal 230, amplified by amplifier $G_0'$, and then low pass filtered to form coefficient $F_0$. Similarly, slicer output signal 220 is delayed by a time "T" corresponding to the delay unit used in feedback equalizer portion 210, mixed with error signal 230, amplified by amplifier $G_1'$, and then low pass filtered to form coefficient $F_1$. The remaining coefficients $F_2$ through $F_K$ are produced analogously as known by those of ordinary skill in the art.

In the timing alignment technique disclosed herein, the coefficient outputs $\{C_0, \ldots, C_K\}$ and $\{F_0, \ldots, F_K\}$ from error mixers 225 and 240 are disconnected from equalizer portions 205 and 210. Thus, the timing alignment described herein is an open loop adjustment. To denote the open loop nature of the coefficients from error mixer 225 during the timing alignment procedure, these coefficients will be denoted as $C_0'$ through $C_N'$. During this open loop operation, the terms $C_0$ through $C_N$ will thus only refer to the coefficients used in equalizer portion 205. Similarly, coefficients from error mixer 240 in an open loop mode of operation will be referred to as $F_0'$ through $F_K'$ such that the terms $F_0$ through $F_K$ will refer only to the coefficients used in equalizer portion 205.

Slicer Timing Adaption

To adjust timing with respect to slicer 215, an adaptive delay circuit 250 having a delay of $\tau_{STA}$ (Slicer Timing Adaptation) is provided in the path that couples slicer input signal 214 to adder 235. The goal of inserting this adaptive delay circuit is to set a delay through slicer 215 ($\tau_{SLC}$) equal to the delay $\tau_{STA}$. To achieve this goal, coefficient $C_0$ is set to 1 and $C_1$ through $C_N$ set to zero. Similarly, coefficients $F_0$ through $F_K$ are also set to zero. A switch $SW_1$ couples slicer input signal 214 to adaptive delay circuit 250. Similarly, a switch $SW_2$ couples slicer input signal 214 to slicer 215.

To begin the slicer timing adaptation procedure, switch $SW_1$ is closed and switch $SW_2$ is opened while input signal s(t) 215 is provided as a sinusoidal input at a frequency in which it is desired to align the group delays of slicer output 220 and an output 251 of adaptive delay circuit 250. In this configuration, the phase of the signal 230 (represented as $\phi_1$) at point $P_1$ is determined. Advantageously, the determination of this phase requires no additional circuitry in that open loop coefficients $C_0'$ through $C_N'$ represent a sampled cross correlation of the signal 230 at point $P_1$ and sinusoidal input s(t) at point $P_2$. By curve fitting a sinusoidal signal $A(t)\sin(2\pi ft+\phi)$ on these open loop coefficients, the quantity $\phi$ represents the phase $\phi_1$ at point $P_1$. For example, a controller 251 may perform this analysis. Controller 251 may be implemented using a processor, hardwired logic, state machine, programmable logic, or other suitable means. Having determined $\phi_1$, the settings of switches $SW_1$ and $SW_2$ may be reversed such that switch $SW_1$ is closed and switch $SW_2$ is open. The sinusoidal input s(t) is then used to excite a phase $\phi_2$ at point $P_1$, which may be measured as just described. The adaptive delay circuit 250 is then adjusted to vary $\tau_{STA}$ such that $\phi_1 = -(\phi_2)$. Controller 251 may control the operation of switches $SW_1$ and $SW_2$ as well as the adaptive delay circuit 250. Alternatively, another controller or controller(s) may be used. In the following discussions, it will be assumed without loss of generality that controller 251 performs the control of the various timing adaptations.

Error Timing Adaptation

In some embodiments, an error timing adaptation is performed as follows. An adaptive delay circuit 260 introduces an error timing adaptation delay ($\tau_{ETA}$) into the input signal s(t) 215 provided to error mixer 225. In this procedure, amplifiers $G_0$ through $G_N$ in error mixer 225 are adjusted to provide the same gain G such that the mixer outputs are not saturated. The center two coefficients $C_i$ and $C_j$ for equalizer portion 205 are set to one with all remaining coefficients in portions 205 and 210 set to zero. With switch $SW_1$ open and switch $SW_2$ closed, input signal s(t) is provided as a pseudo random binary sequence (PRBS) input. The resulting open loop coefficients $C_0'$ through $C_N'$ from such an excitation may then be interpolated to determine the point of maxima on the interpolated curve. The adaptive delay circuit 260 is then adjusted to vary $\tau_{ETA}$ such that the point of maxima occurs between the center two coefficients $C_i'$ and $C_j'$ (and corresponding mixers/taps).

Feedback Loop Timing Adaptation

In some embodiments, an adaptive delay circuit 265 having an adaptive feedback delay of ($\tau_{FBK}$) is provided at the input to feedback equalizer portion 210. The goal of adjusting this adaptive delay is to achieve a desired loop delay ($\tau_{LOOP}$) that equals the sum of the delay through the slicer ($\tau_{SLC}$) plus the feedback delay $\tau_{FBK}$. For example, at a 10 GHz symbol rate, the desired $\tau_{LOOP}$ would be 100 pico seconds. In this procedure, the center two coefficients $C_i$ and $C_j$ for equalizer portion 205 are set to 1 with all remaining coefficients in equalizer portions 205 and 210 set to zero. With switch $SW_1$ open and switch $SW_2$ closed, input signal s(t) is provided as a sinusoid at a frequency f equaling ($1/2(\tau_{LOOP})$). Thus, at a 10 GHz symbol rate, the input frequency f would be 5 GHz. In response to this excitation, the phase $\phi_1$ at point $P_1$ may be determined as described previously. The coefficient $F_0$ may then be set to zero with all the remaining coefficients unchanged so that a phase $\phi_2$ at point $P_1$ may be determined with the same sinusoidal excitation and switch settings. The adaptive delay circuit 265 may then be controlled to vary $\tau_{FBK}$ such that $\phi_i$ equals $\phi_2$.

Feedback Data and Error Path Timing Alignment

In some embodiments, an adaptive delay circuit 275 having an adaptive feedback delay of ($\tau_{FETA}$) is provided at the input to error mixer 240. Controller 251 may then adaptively tune the delay provided by delay circuit 275 by setting the center two coefficients for feedforward equalizer portion 205 to one and its remaining coefficients to zero. The coefficients in feedback equalizer portion 210 are also set to zero. In addition, switch $SW_1$ is opened and switch $SW_2$ closed. With equalizer 200 in this configuration, an input signal s(t) having a sinusoidal frequency f equaling $1/4*(\tau_{LOOP})$ may be used as the excitation. For example, if the symbol rate is 10 GHz, a frequency f of 2.5 GHz may be used. With this excitation present, controller 251 varies $\tau_{FETA}$ until open loop coefficient $F_0'$ is zero.

Consider the advantages of the preceding timing adjustments. Regardless of variations in performance such as those produced by semiconductor process variations and the like, a continuous time equalizer is provided that automatically adjusts itself to correct for any timing misalignments.

Although the invention has been described with respect to particular embodiments, this description is only an example of the invention's application and should not be taken as a limitation. For example, although the previous embodiments included error mixers using LMS-based coefficient adaptation, other adaptation techniques may be implemented. Consequently, the scope of the invention is set forth in the following claims.

What is claimed is:

1. A continuous time equalizer for equalizing an input signal using a feedforward equalizer portion and a feedback equalizer portion, wherein the feedforward equalizer portion uses a first set of coefficients and the feedback equalizer portion uses a second set of coefficients, comprising:

a slicer operable to make bit decisions on a combined output from the feedforward and feedback equalizer portions to form a slicer output;

a first adaptive delay circuit operable to delay the combined output to form a delayed output;

a feedforward error mixer configured to process an error signal representing the difference between the slicer output and the delayed output to form the first set of coefficients in a closed mode of operation, the feedforward error mixer forming a first set of open loop coefficients in an open loop mode of operation;

a first switch operable to couple the combined output to the adaptive delay circuit;

a second switch operable to couple the combined output to the slicer; and a controller operable to control the delay provided by the first adaptive delay circuit such that a first group delay through the slicer and a second group delay through the first adaptive delay circuit are substantially equal in response to a sinusoidal form of the input signal by performing the following acts;

setting the feedforward error mixer into the open loop mode of operation;

setting a first coefficient $C_0$ in the first set to 1 and the remaining coefficients in the first set to zero;

setting the coefficients in the second set to be all equal;

setting the first switch ON and the second switch OFF and determining a first phase of the error signal;

setting the first switch OFF and the second switch ON and determining a second phase of the error signal; and controlling the delay such that the first phase equals the opposite of the second phase.

2. The continuous time equalizer of claim 1, wherein the controller is configured to determine the phase of the error signal by analyzing the first set of open loop coefficients.

3. The continuous time equalizer of claim 2, wherein the controller is configured to analyze the first set of open loop coefficients by fitting a sinusoid to the first set of open loop coefficients.

4. The continuous time equalizer of claim 1, further comprising:

a second adaptive delay circuit operable to delay the input signal to form an delayed input;

wherein the controller is further operable to perform the following acts:

configure the feedforward error mixer into the open loop mode of operation;

set a subset of two center coefficients in the first set to one and the remaining coefficients in the first set to zero;

set the coefficients in the second set to zero; and control the delay provided by the second adaptive delay circuit such that a maximum occurs between a subset of two center coefficients in open loop coefficients in response to a pseudo random bit sequence (PRBS) form of the input signal.

5. The continuous time equalizer of claim 4, wherein the feedforward error mixer is a least-mean-square-based feedforward error mixer.

6. The continuous time equalizer of claim 4, further comprising:

a third adaptive delay circuit operable to delay the slicer output to form a delayed input signal to the feedback equalizer portion;

wherein the controller is further operable to perform the following acts;

configure the feedforward error mixer into the open loop mode of operation;

set a subset of two center coefficients in the first set to one and the remaining coefficients in the first set to zero;

set the coefficients in the second set to zero and determine a first phase of the error signal;

set a first coefficient F0 in the second set to one and the remaining coefficients in the second set to zero and determine a second phase of the error signal; and control the delay provided by the third adaptive delay circuit such that the first phase equals the second phase in response to the input signal having a sinusoidal frequency.

7. The continuous time equalizer of claim 6, the slicer provides a slicer delay to the slicer output and wherein a loop delay equals the sum of the slicer delay and the delay provided by the third adaptive delay circuit, and wherein the sinusoidal frequency equals (½*(loop delay)).

8. The continuous time equalizer of claim 6, wherein the controller is configured to determine the first and second phase of the error signal by analyzing the first set of open loop coefficients.

9. The continuous time equalizer of claim 8, wherein the controller is configured to analyze the first set of open loop coefficients by fitting a sinusoid to the first set of open loop coefficients.

10. The continuous time equalizer of claim 6, further comprising:

a feedback error mixer configured to process the error signal and delayed input signal to form the second set of coefficients in the closed mode of operation, the feedback error mixer forming second open loop coefficients in the open loop mode of operation;

wherein the controller is further operable to perform the following acts:

configure the feedforward and feedback error mixers into the open loop mode of operation;

set a subset of two center coefficients in the first set to one and the remaining coefficients in the first and second set to zero; and control the delay provided by the third adaptive delay circuit until a first coefficient F0' in the second open loop coefficients equals zero in response to the input signal having a sinusoidal frequency.

11. The continuous time equalizer of claim 10, wherein the sinusoidal frequency is 1/(4*(a loop delay)).

12. The continuous time equalizer of claim 10, wherein both the feedforward error mixer and the feedback error mixer are least-mean-squares-based error mixers.

13. The continuous time equalizer of claim 10, wherein the controller comprises a microprocessor.

* * * * *